Nov. 5, 1968 W. E. NEMETH 3,409,786

FAST ATTACK-SLOW RELEASE ELECTRONIC RELAY

Filed April 19, 1965 2 Sheets-Sheet 1

INVENTOR.
WILLIAM E. NEMETH
BY Alden D. Redfield
Charles M. Hogan
ATTORNEYS.

INVENTOR.
WILLIAM E. NEMETH
BY Alden D. Redfield
Charles M. Hogan
ATTORNEYS.

United States Patent Office 3,409,786

Patented Nov. 5, 1968

3,409,786

FAST ATTACK-SLOW RELEASE ELECTRONIC RELAY

William E. Nemeth, Cincinnati, Ohio, assignor to Avco Corporation, Cincinnati, Ohio, a corporation of Delaware Filed Apr. 19, 1965, Ser. No. 449,115
8 Claims. (Cl. 307—247)

ABSTRACT OF THE DISCLOSURE

This is an electronic relay which, on command, closes and which, after a predetermined delay following removal of the command, opens. It includes a silicon-controlled rectifier switching device having a gating element, and means for supplying a command for closing the switching device and an order for opening the switching device. It includes further a source of energy and means for opening the switching device at a predetermined time following removal of the command. This means includes a monostable device, means responsive to the order for turning off the monostable device, a resistor in series with the feedback capacitor in the monostable to constitute a timer, and means responsive to the final "on" condition of the monostable device to open the switching device. The monostable device comprises a pair of transistors arranged in complementary fashion with feedback circuitry including the feedback capacitor. This capacitor is arranged in a series circuit with the switching device and the energy source and the resistor and capacitor are proportioned in such a way that, on removal of the command, the monostable device is held off for a predetermined period of time and then turned on.

The present invention relates to electronic relay devices, and, more specifically, it provides an improved relay characterized by fast attack and slow release.

A primary object of the invention is to provide an electronic relay which responds quickly to a command to perform a switching function (i.e., closing) and which, following removal of the command and after a predetermined delay, performs the reverse switching function (i.e., opening).

It is also an object of the invention to provide an electronic relay in which the aforementioned time delay is fairly insensitive to changes in supply voltage and ambient temperature.

A further object of the invention is to provide an electronic relay which involves no standby power or current drain.

A further object of the invention is to provide an electronic relay in which the timing elements cannot be driven into conductivity until the first-mentioned switching function (i.e., closing) is performed.

Yet another object of the invention is to provide a relay of wide utility for controlling high load power by the use of a low power signal source and with low power switching means.

For a better understanding of the invention, together with other and further objects, advantages, and capabilities thereof, reference is made to the following description of the appended drawings, in which.

Figure 1:
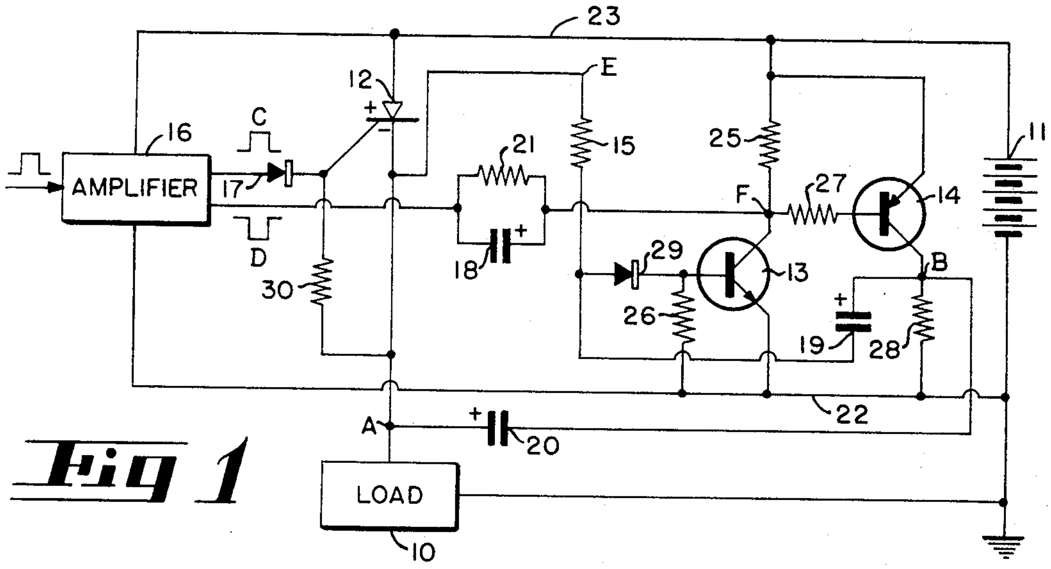
FIG. 1 is a circuit schematic of a form of electronic relay in which the switching device or control switch element is in the high voltage side of a power-load circuit.

In accordance with a narrow aspect of the invention, there are provided the combination of a switching device 12, and means for closing the switching device during command and opening the switching device at a predetermined time following removal of the command, comprising: means 16 for supplying a command; an energy source 11; a monostable device (including 13 and 14) of the type which is stable when in its conductive state, said monostable device having a supply circuit adapted to be coupled (see E) to the energy source when the switching device is closed, whereupon the monostable device is enabled to respond to a command to become conductive; means (18, 21) responsive to the termination of the command for turning off the monostable; resistance-capacitance timing means (15, 19) in circuit with said energy source and coupled to said monostable (by 29) and so proportioned and arranged that it discharges when the monostable is turned off and, after said predetermined time, turns the monostable back on; and means (20) responsive to the last-mentioned "on" condition of the monostable to open said switching device.

In the particular application herein shown in FIG. 1, the anode-cathode circuit of a silicon-controlled rectifier 12 is inserted in circuit between a load 10 and a battery or source of energy 11 in order to close or open the energizing circuit as desired. That is, when switching device 12 (i.e., the silicon-controlled rectifier) is gated on, the load is coupled to the battery or source 11.

The FIG. 1 arrangement functions in such a manner that, in response to a command (an impulse applied to amplifier 16), the silicon-controlled rectifier 12 is gated on, and it remains on so long as the command is present and remains on with a time lag. Upon removal of the command, the FIG. 1 circuitry (shown to the right of rectifier 12) performs a timing function and operates in such a way that the silicon-controlled rectifier 12 is turned off after a predetermined timing period.

In the FIG. 1 embodiment the input or gate element of rectifier 12 is coupled, via diode 17, to an amplifier 16, at the output of which there appears, when a command is applied to the amplifier, a signal in the form of positive pulse C, for example. The switch 12 is turned or gated on, or closed, by the positive command pulse C. The diode 17 is provided in order to protect the amplifier from a high positive "turn-off" transient, which occurs when the "off" or "switch open" phase of operation of rectifier 12 takes place.

The timing function mentioned above is performed by a complementary multivibrator which comprises transistor 13 (NPN), transistor 14 (PNP), and associated elements. As here shown, this complementary multivibrator is a monostable device, and it is stable during that condition of operation in which both transistors 13 and 14 are conducting.

At the time when a command comes in to the FIG. 1 electronic relay device, the transistors 13 and 14 are off, because the initial drive point (base of 13) of the complementary multivibrator (hereinafter referred to as a monostable) is disconnected by the open switch 12 from the positive terminal of bias supply 11. That is, there is a dependency between the monostable and the switch whereby the monostable cannot be turned on unless the switch 12 is closed. This arrangement has the considerable advantage of no current drain or standby power requirement.

The emitter of transistor 13 is connected directly to the ground line 22, which in turn is directly connected to the negative terminal of battery 11. Beginning with the positive terminal of that battery and tracing the initial-drive bias circuit for the transistors 13 and 14, it comprises the high side line 23, the anode-cathode circuit of switch 12, and point E, inter alia. Resistor 25 is connected between line 23 and the collector of transistor 13 as a collector load and current-limiting resistor. A base tie-down resistor 26 is connected between the base of transistor 13 and ground 22. The collector of transistor 13 is coupled to the base of transistor 14 by resistor 27. The emitter of transistor 13 is connected to ground, and the emitter of transistor 14 is connected to line 23. A collector load resistor 28 is provided between the collector of transistor 14 (i.e., point B) and ground.

In order to control the turning off of the silicon-controlled rectifier type switching device, the amplifier 16 also produces a negative output pulse D. Between the output of amplifier 16 which provides this pulse and point F (i.e., the junction of resistors 25 and 27) there is provided a time constant circuit which comprises the parallel combination of a resistance 21 and a capacitance 18. As is indicated below, when a command is received the monostable turns on, and the capacitor in the time constant circuit comprising the elements 18 and 21 is quickly charged. When the command terminates, the charge on capacitor 18 is such that the potential at point F becomes positive, thereby biasing transistor 14 into non-conductivity. The discharge time constant of the circuit involving the elements 18 and 21 is shorter than the time constant of the below-described circuit involving the elements 19 and 15.

As has been indicated, the negative pulse D charges up capacitor 18 in such manner that its terminal adjacent the monostable is positive.

Due to the drive through resistor 15, as the switch 12 is closed the monostable is turned on (i.e., both transistors 13 and 14). Capacitors 18 and 19 are charged up to the polarity indicated. As long as the command signal is present, the solid state devices 12, 13, and 14 are in conduction.

Attention is now directed to the timing circuit, which comprises, in series, resistor 15 and capacitor 19, disposed between points E and B (B being the ungrounded terminal of resistor 28). As long as the command signal is present, capacitor 19, which is quickly charged, retains a charge such that its terminal adjacent point B is positive relative to its other terminal. Capacitor 20 is connected between point B and ungrounded load terminal A, but it accumulates no charge during the phase of operation (i.e., monostable conducting) now under consideration because the two points A and B are of the same positive potential.

Let there now be considered the events which occur when the command signal is removed. When that occurs, the potential applied to the monostable at point F rises, thereby back-biasing PNP transistor 14 so that transistor 14 tends to turn off, causing the potential of point B to fall to a value near ground potential. This drop in potential is applied, via capacitor 19 and diode 29, to the base of transistor 13, tending to cut off transistor 13. Due to rapid regenerative action, the monostable becomes nonconductive, both transistors 13 and 14 turning off. The voltage at the load terminal A is then more positive than that of point B, and capacitor 20 charges accordingly. It has been stated that the monostable has been turned off. Therefore the timing capacitor 19 discharges through resistor 15, and capacitor 18 discharges through its shunting resistor 21. When capacitor 19 has completely discharged and has begun to charge in the opposite direction, the potential at the base of transistor 13 becomes positive and, due to regenerative action, the monostable is rapidly turned on, so that the voltage at point B rises sharply. This rise is coupled through capacitor 20 to the cathode of the silicon-controlled rectifier 12, turning it off.

Parenthetically, the purpose of diode 29, connected between the base of transistor 13 and capacitor 19, is to protect that base from excess negative voltage at the junction of elements 15 and 19 during the timing period.

Attention is invited to the fact that, during the timing period, both transistors 13 and 14 are off. They are turned off at the beginning of the timing period, and they go on at the closing of the timing period, being again cut off when switch 12 is opened. Since the transistors are off during the timing period, the timing is independent of any temperature effects, so far as the solid state devices 13 and 14 are concerned. The only material factors affecting the timing are the temperature characteristics of the time constant circuit elements 15 and 19, which can be made negligible by a proper choice of those two elements. Additionally, the timing is not affected by wide supply voltage variations.

It will be understood from the foregoing that the timing operation involves the following sequence of events: (1) removal of command signal turns off the monostable; (2) capacitor 19 in the time constant circuit changes its charge, during a predetermined timing period when it holds the monostable off, in such a way as to turn the monostable back on; (3) as the monostable is turned on, it opens the switch 12; (4) the switch 12 disconnects the monostable from its source of drive (the drive circuit through 15), thereby turning it off.

Figure 2:
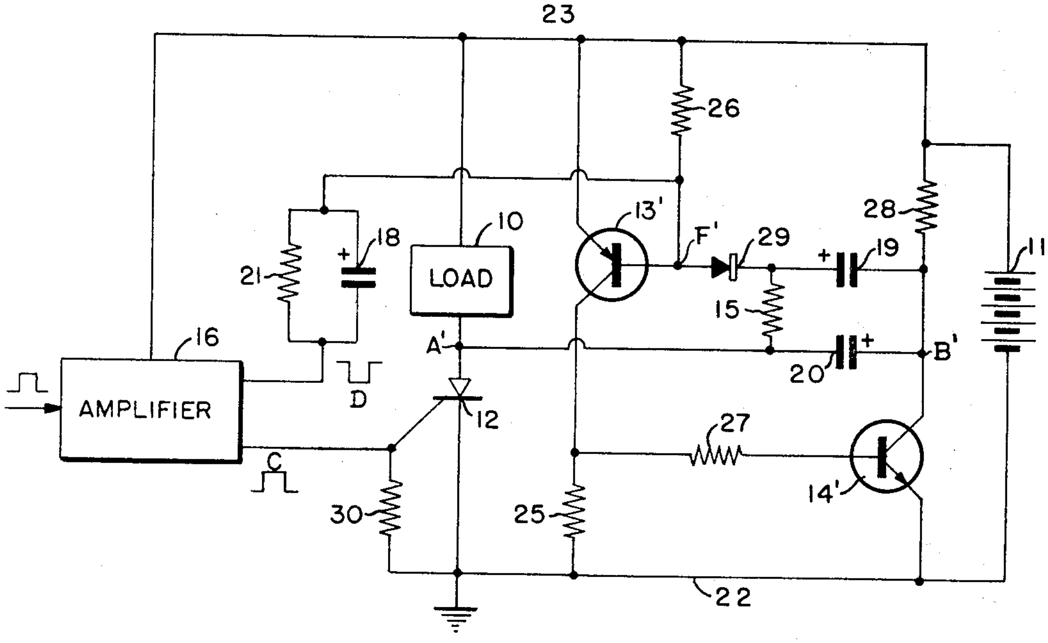
FIG. 2 is a circuit schematic of a modified form of electronic relay in which the control switch is in the low side of the load circuit.

In the FIG. 2 version, the same reference numerals and letters are employed to designate elements and points like in function to the corresponding elements of FIG. 1, and the same reference numerals and letters primed are used to designate similar elements and points.

The major difference between the FIGS. 1 and 2 embodiments resides in the fact that in FIG. 2 the silicon-controlled rectifier 12 is located between the load and ground.

The transistor 13' is type PNP and the transistor 14' is type NPN, so that a negative drive applied to the base of transistor 13' is utilized to drive these two transistors into conductivity. At the time when a command comes in to the FIG. 2 relay device, the monostable comprising transistors 13' and 14' is off, the resistor 15 being disconnected by the open switch 12 from the negative terminal of the bias supply 11. The emitter of transistor 13' is connected directly to the high potential line 23, which in turn is directly connected to the positive terminal of battery 11. Beginning with the negative terminal of that battery and tracing the initial-drive circuit for the transistors 13' and 14', it comprises: the low side line 22, the cathode-anode circuit of switch 12, and resistor 15. Resistor 25 is connected between ground 22 and the collector of transistor 13' as a collector load and current-limiting resistor. A base tie-down resistor 26 is connected between the base of transistor 13' and the high side 23. The collector of transistor 13' is coupled to the base of transistor 14' by resistor 27. The emitter of transistor 13' is connected to line 23, and the emitter of transistor 14' is connected to ground line 22. A collector load resistor 28 is provided between the collector of transistor 14' (point B') and line 23.

In order to control the turning off of the silicon-controlled rectifier type switching device 12 of FIG. 2, the amplifier 16 also produces a negative pulse D. Between the output of amplifier 16 which produces this pulse and point F' (i.e., the base of transistor 13'), there is provided the timing circuit comprising resistor 21 and capacitor 18. As is indicated below, when a command is received the monostable turns on, and the capacitor 18 is quickly charged. When the command terminates, the charge on capacitor 18 is such that the potential at point F' becomes positive, thereby biasing transistor 13' into non-conductivity. Again the discharge time constant of the circuit 18, 21 is shorter than that of circuit 19, 15. As has been indicated, the negative pulse D charges up capacitor 18 in such manner that its terminal adjacent the monostable is positive.

Due to the drive through resistor 15, which in this case (FIG. 2) is negative, the monostable is turned on. It will be observed that, until switch 12 is closed, the monostable cannot be turned on, and the PNP transistor 13' cannot obtain a negative drive for its base. (Parenthetically, in the FIG. 1 embodiment the NPN transistor 13 cannot obtain a positive drive to turn on the monostable until rectifier 12 there is closed.) Again, as long as the command signal is present the solid state devices 12, 13', and 14' (FIG. 2) conduct.

In FIG. 2 the timing circuit comprises resistor 15 and capacitor 19, in series between points A' and B'. As long as the command signal is present, the quickly charged capacitor 19 retains a charge such that its terminal adjacent point B' is negative relative to its other terminal. Capacitor 20 is connected between point B' and load terminal A', but it accumulates no charge during the phase of operation presently under discussion.

When the command is removed, the potential applied to the monostable at point F' rises, thereby turning off transistor 13', causing the potential at point B' to rise. This rising potential is applied via capacitor 19 and diode 29 to the base of PNP transistor 13'. Due to rapid regenerative action, the monostable becomes non-conductive. Then the voltage at load terminal A' is more negative than that at point B', and capacitor 20 is charged accordingly. Since the monostable has been turned off, the timing capacitor 19 discharges through resistor 15, and capacitor 18 discharges through its shunting resistor 21. When capacitor 19 has completely discharged and starts to charge in the opposite direction, the potential at the base of transistor 13' becomes negative, and, again due to regenerative action, the monostable is rapidly turned on, so that the voltage at point B' falls sharply. This fall, being coupled through capacitor 20 to the anode of rectifier 12, turns rectifier 12 off. Parenthetically, the purpose of diode 29, connected between capacitor 19 and the base of transistor 13', is to protect the base of transistor 13' against excessive positive voltage at the junction of elements 15 and 19 during the timing period. It will of course be understood that the resistor 30 is the conventional gate to ground resistor for a silicon-controlled rectifier. Resistor 26 is the base tie-down resistor for transistor 13'.

Figure 3:
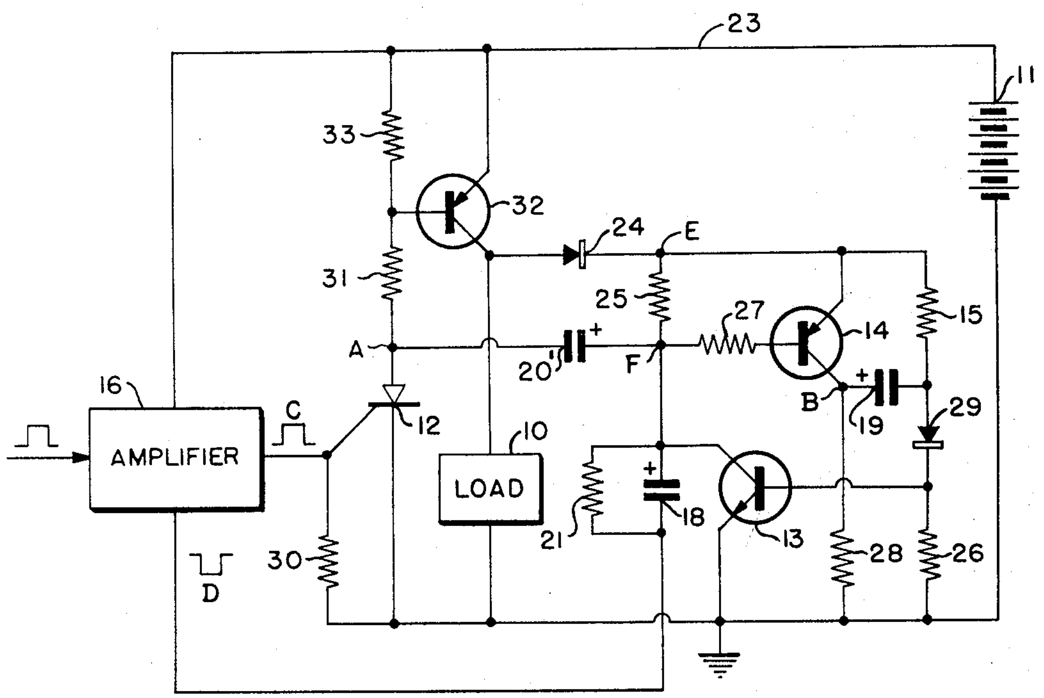
FIG. 3 is the third and preferred form of the invention in which the immediate switching functions are performed by a transistor coupled to a silicon-controlled rectifier.

It will be recognized readily by those skilled in the art that the FIG. 3 embodiment is quite similar to FIG. 1, with the following exceptions: (1) the silicon-controlled rectifier is so arranged, with its anode coupled via resistor 31 to the base of a PNP type transistor 32, that the silicon-controlled rectifier drives or gates the PNP transistor 32; (2) the load 10 is in circuit with the emitter-collector circuit of transistor 32 so that that circuit functions as the switch for coupling battery 11 to load 10; (3) capacitor 20' is connected between the collector of transistor 13 and the anode side of the silicon-controlled rectifier 12; (4) the base of transistor 32 is connected to the junction of resistors 31 and 33, these, in conjunction with the switch path of element 12, being a voltage divider across battery 11; (5) the emitter of transistor 32 is connected to line 23, and the collector to load 10.

In the FIG. 3 embodiment the elements 12 and 32 function together to take care of the principal switching function, becoming conductive substantially at the same time. The silicon-controlled rectifier 12 is turned off by a drop in potential at point F in the collector circuit of transistor 13. Stating the difference between FIGS. 1 and 3 generally, the FIG. 3 embodiment includes the repeater transistor 32 "slaved" to the silicon-controlled rectifier.

In each case the values of parameters 15 and 19 determine the delay time. The system may be made essentially free of environmental changes by compensation of resistor 15 and capacitor 19.

By incorporating a variable resistance element and/or a variable capacitance element in lieu of the elements 15 and/or 19, the timing may be varied or adjusted as desired.

The FIG. 3 embodiment is preferred for several reasons, including the fact that a relatively small capacitor 20' is employed.

The following parameters are illustrative and have been utilized in one operating embodiment of the invention in accordance with FIG. 1:

| | | |
|---|---|---|
| Capacitor **18** | microfarad | 1 |
| Capacitor **19** | do | 10 |
| Capacitor **20** | do | 1 |
| Resistor **15** | ohms | 330,000 |
| Resistor **21** | do | 30,000 |
| Resistor **25** | do | 10,000 |
| Resistor **26** | do | 47,000 |
| Resistor **27** | do | 10,000 |
| Resistor **28** | do | 10,000 |
| Resistor **30** | do | 2000 |
| Rectifier **12** | | Type 4L60 |
| Transistor **13** | | Type 2N2898 |
| Transistor **14** | | Type 2N2590 |
| Battery **11** | volts | 18–40 |
| Load **10** | ohms | 60–6000 |

The parameters of FIG. 3 are the same as those for FIG. 1, except as indicated below:

| | | |
|---|---|---|
| Capacitor **20'** | microfarad | 0.1 |
| Resistor **31** | ohms | 5600 |
| Resistor **33** | do | 2000 |
| Transistor **32** | | Type 2N3203 |
| Transistor **13'** | | Type 2N2898 |
| Transistor **14'** | | Type 2N2590 |

The purpose of diode 24 in FIG. 3 is to prevent leakage current from the amplifier 16 through the monostable when switch 12 is open.

While there have been shown and described what are at present considered to be the preferred embodiments of the invention, it will be understood by those skilled in the art that various changes and modifications may be made therein without departing from the scope of the invention as defined by the appended claims.

I claim:

1. In a command operated relay, the combination of:

a switching device having a gating element;

means for supplying a command to said gating element to close the switching device, said means including means for supplying an order to open the switching device, a source of energy; and means for opening the switching device at a predetermined time following removal of the command, comprising:

first, a monostable device of the type which is stable when in its conductive "on" state, said monostable device having a supply circuit adapted to be coupled to the source of energy when the switching device is closed, whereupon the monostable device becomes conductive, said monostable device comprising first and second transistors each having an output and an input, means for coupling the output of the first transistor to the input of the second, and means including a feedback capacitor for coupling the output of the second transistor to the input of the first, second, means responsive to the order for turning off the monostable, third, a resistance in circuit with said switching device and said energy source, said resistance being connected in series with said capacitor to convey said command to the input of said first transistor and to constitute timing means in combination with said capacitor, said resistance and said capacitor being so proportioned and arranged that the monostable device is held off for a predetermined time and then turned on after said predetermined time; and fourth, means responsive to the last mentioned "on" condition of the monostable device to open said switching device.

2. In a command-operated relay, the combination in accordance with claim 1 in which the switching device is an electronic switch.

3. In a command-operated relay, the combination in accordance with claim 2 in which the switching device is a silicon-controlled rectifier.

4. In a command-operated relay, the combination in accordance with claim 3 in which the switching device comprises the combination of a third transistor in circuit with a load, and means including a silicon-controlled rectifier for controlling the conductivity of the third transistor.

5. The combination in accordance with claim 4 and including a diode in the means for coupling the output of the second transistor to the input of the first.

6. The combination of:

an energy source having positive and negative terminals;

a load;

a silicon-controlled rectifier having an anode-cathode circuit coupled between said load and said energy source and also having a gate element;

a signal-translating device having outputs for producing an output command pulse of positive polarity and an order pulse of negative polarity, said pulse of positive polarity being applied to said gate element to render the silicon-controlled rectifier conductive to couple the load to said energy source;

and means responsive to the termination of said pulse of negative polarity to measure a timed interval and then to open said gate, the last-mentioned means comprising:

first, a monostable device and first and second energy storage devices, the monostable device comprising:

an NPN transistor having an emitter and a collector and a base, said emitter being connected to the negative terminal of said source, a NPN transistor having an emitter and a collector and a base, said emitter being connected to the positive terminal of said source, a first resistor between the base of first transistor and said negative terminal, a second resistor between the collector of said first transistor and the positive terminal of said source, a feedback capacitor between the collector of the second transistor and the base of the first transistor, a third resistor between the collector of said first transistor and the base of said second transistor, and a fourth resistor between the collector of said second transistor and said negative terminal; and second, a fifth resistance in circuit with said switching device and said energy source, said resistance being connected in series with said feedback capacitor to convey said command to the input of said first transistor and to constitute timing means in combination with said capacitor, said resistance and said capacitor being so proportioned and arranged that the monostable device is held off for a predetermined time and then turned on after said predetermined time, said first energy storage device comprising the parallel combination of a second capacitor and a sixth resistor connected between the negative pulse output of said signal-translating device and said third resistor to develop a potential which, upon termination of said negative pulse, turns off said monostable device;

the feedback capacitor then changing its state of charge in such a manner as to hold the monostable off and to keep it off for said predetermined period and finally to turn it on;

said second energy storage device comprising a third capacitor connected between the cathode of said rectifier and the collector of said second transistor to apply to said cathode a turn-off bias for the rectifier when said monostable is turned on by said timing means.

7. The combination of:

an energy source having positive and negative terminals;

a load;

a silicon-controlled rectifier having an anode-cathode circuit coupled between said load and said energy source and also having a gate element;

a signal-translating device having outputs for producing an output command pulse of positive polarity and an order pulse of negative polarity, said pulse of positive polarity being applied to said gate element to render the silicon-controlled rectifier conductive to couple the load to said energy source;

and means responsive to the termination of said pulse of negative polarity to measure a timed interval and then to open said gate, the last-mentioned means comprising:

first, a monostable device and first and second energy storage devices, the monostable device comprising:

a PNP transistor having an emitter and a collector and a base, said emitter being connected to the positive terminal of said source, an NPN transistor having an emitter and a collector and a base, said emitter being connected to the negative terminal of said source, a first resistor between the base of the first transistor and said positive terminal, a second resistor between the collector of said first transistor and the negative terminal of said source, a feedback capacitor between the collector of the second transistor and the base of the first transistor, a third resistor between the collector of said first transistor and the base of said second transistor, and a fourth resistor between the collector of said second transistor and said positive terminal, and second, a fifth resistor in circuit with said switching device and said energy source, said resistance being connected in series with said feedback capacitor to convey said command to the input of said first transistor and to constitute timing means in combination with said capacitor, said resistance and said capacitor being so proportioned and arranged that the monostable device is held off for a predetermined time and then turned on after said predetermined time, said first energy storage device comprising the parallel combination of a second capacitor and a sixth resistor connected between the negative pulse output of said signal-translating device and said first resistor to develop a potential which, upon termination of said negative pulse, turns off said monostable device, the feedback capacitor then changing its state of charge in such a manner as to hold the monostable off and to keep it off for said predetermined period and finally to turn it on, said second energy storage device comprising a third capacitor connected between the anode of said rectifier and the collector of said second transistor to apply to said anode a turn-off bias for the rectifier when said monostable is turned on by said timing means.

8. The combination of:

an energy source having positive and negative terminals;

a load;

a first PNP-type switching transistor having a base and an emitter and a collector, the collector and load being in series circuit with said negative terminal, and the emitter being connected to said positive terminal;

a diode connected to said collector;

a silicon-controlled rectifier having an anode-cathode circuit and also a gate element;

a resistive voltage-divider arranged in a series circuit with said anode-cathode circuit across said energy source;

a connection between said resistive voltage-divider and the base of said switching transistor;

a signal-translating device having outputs for producing an output command pulse of positive polarity and another pulse of negative polarity, said pulse of positive polarity being applied to said gate element to render the silicon-controlled rectifier and the first PNP-type switching transistor conductive to couple the load to said energy source;

and means responsive to the termination of said pulse of negative polarity to measure a timed interval and then to open said gate, the last-mentioned means comprising:

first, a monostable device and first and second energy storage devices, the monostable device comprising:

an NPN transistor having an emitter and a collector and a base, a PNP transistor having an emitter and a collector and a base, a first resistor between the base of the NPN transistor and said negative terminal, a second resistor between the collector of said NPN transistor and said diode, a feedback capacitor between the collector of the second PNP transistor and the base of the NPN transistor, a third resistor between the collector of said NPN transistor and the base of said second PNP transistor, and a fourth resistor between the collector of said second PNP transistor and said negative terminal, and second, a fifth resistance connected between said diode and said feedback capacitor, said resistance being connected in series with said feedback capacitor to convey said command to the input of said first transistor and to constitute timing means in combination with said capacitor, said resistance and said capacitor forming a connection coupled to the base of the NPN transistor and being so proportioned and arranged that the monostable device is held off for a predetermined time and then turned on after said predetermined time, said first energy storage device comprising the parallel combination of a second capacitor and a sixth resistor connected between the negative pulse output of said signal-translating device and said third resistor to develop a potential which, upon termination of said negative pulse, turns off said monostable device, the feedback capacitor then changing its state of charge in such a manner as to hold the monostable off and to keep it off for said predetermined period and finally to turn it on, said second energy storage device comprising a third capacitor connected between the anode of said rectifier and the collector of said NPN transistor to apply to said anode a turn-off bias for the rectifier when said monostable is turned on by said timing means.

No references cited.

ARTHUR GAUSS, *Primary Examiner.*

J. D. FREW, *Assistant Examiner.*

UNITED STATES PATENT OFFICE
CERTIFICATE OF CORRECTION

Patent No. 3,409,786

November 5, 1968

William E. Nemeth

It is certified that error appears in the above identified patent and that said Letters Patent are hereby corrected as shown below:

Column 7, line 42, "NPN" should read -- PNP --.

Signed and sealed this 27th day of January 1970.

(SEAL)
Attest:

Edward M. Fletcher, Jr.
Attesting Officer

WILLIAM E. SCHUYLER, JR.
Commissioner of Patents